A. GORDON, J. H. MYERS, G. TELFORD, &
M. G. HUBBARD.
Harvester.

No. 166,605.

Patented Aug. 10, 1875.

Witnesses.
Alex Mahon
John G. Center.

Inventors.
Alexr Gordon, Geo. Telford,
Jacob H. Myers, M. G. Hubbard,
by A. M. Smith, attorney.

UNITED STATES PATENT OFFICE.

ALEXANDER GORDON, JACOB H. MYERS, GEORGE TELFORD, AND MOSES G. HUBBARD, OF ROCHESTER, ASSIGNORS TO THE DIFFERENTIAL-GEARING COMPANY, OF SYRACUSE, NEW YORK.

IMPROVEMENT IN HARVESTERS.

Specification forming part of Letters Patent No. 166,605, dated August 10, 1875; application filed February 21, 1873.

*To all whom it may concern:*

Be it known that we, ALEXANDER GORDON, JACOB H. MYERS, GEORGE TELFORD, and MOSES G. HUBBARD, all of Rochester, county of Monroe and State of New York, have invented certain new and useful Improvements in Harvesters, of which the following is a full, clear, and exact description, reference being had to the accompanying drawing making part of this specification, in which—

Figure 1:
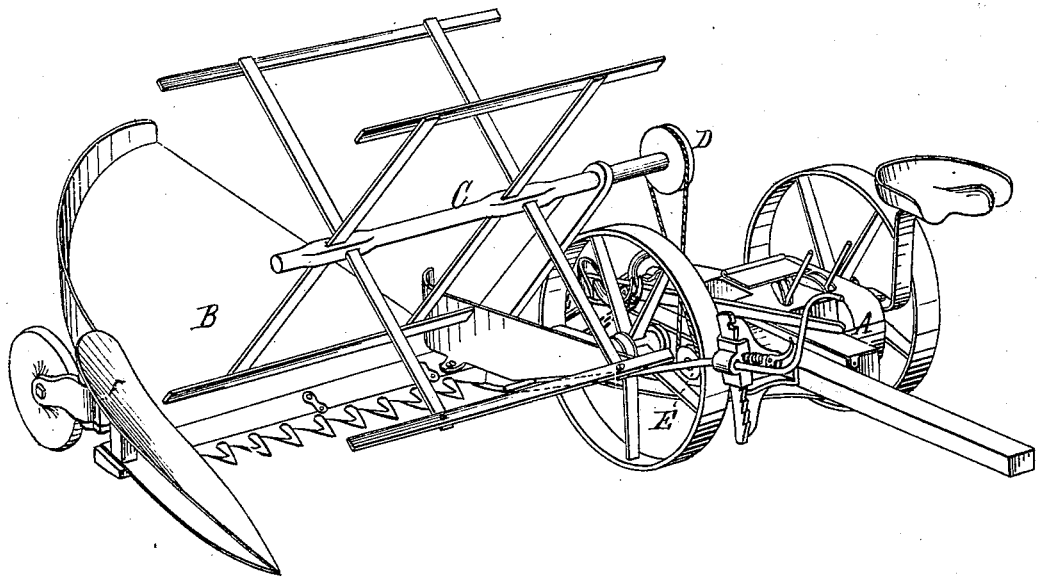
Figure 2:
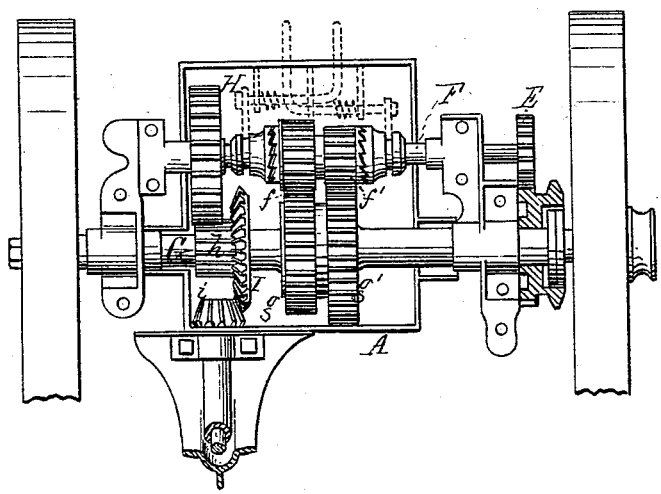

Figure 1 is a perspective view of the machine, and Fig. 2 is a plane or top view of the gear-frame and gearings with the cover removed.

Similar letters of reference denote corresponding parts in both figures.

The invention consists in the combination of the pulley or wheel from which motion is imparted to the reel or rake (either or both) with a differentially-geared shaft, from which motion is also imparted to the cutters, in such manner that, when the speed of the cutters is varied to meet the requirements of different conditions of the crop, the speed of the reel or rake will be correspondingly varied to also meet said requirements.

In the accompanying drawing, A represents the main frame of the machine; B, the platform; C, the ordinary overhung reel, or, in lieu of which, any of the usual forms of reel, or rake and reel combined, may be used. Upon the reel or rake shaft is a pulley or sprocket-wheel, D, keyed to said shaft, and receiving its movements through a band or chain from a pulley or wheel, E, on the secondary shaft F, which is differentially geared as follows: The main axle G has secured to it a double gear or two spur gears, $g\ g$, of unequal diameters, from either of which motion may be imparted to the shaft F through either of two pinions, $f\ f'$, also of unequal diameters, the large one, $f$, adapted to mesh with the smaller driving-gear $g$, for giving a slow motion to the shaft F, and the smaller pinions $f'$ adapted to engage with the larger driving-gear $g'$, for giving a more rapid rotation to the shaft. The pinions are engaged with the shaft F by means of clutches and shifting forks or levers, by which either one may be made to rotate the shaft, while the other, being disengaged from its shaft, is free to rotate thereon, thus driving the shaft F, and with it the wheel E, at rates of speed varying according to the relative differences in the sizes of the driving-gears and pinions employed. H is a spur-wheel keyed to the shaft F, and rotating therewith, and from which motion is imparted to a pinion, $h$, mounted and turning loosely on the main axle. I is a bevel-wheel, cast or otherwise rigidly connected to and rotating with the pinion $h$, and from which motion is imparted to a pinion, $i$, on the crank-shaft, from which motion is imparted to the cutter-bar through the usual crank-and-pitman connection. Both the cutters and the reel being thus driven from the same differentially-geared shaft F, of course any change in the speed of rotation of said shaft will be communicated to both, and the change adapting the cutters to the heavier or lighter work required of them will effect a corresponding change in the movements of the reel or rake, causing them to maintain a uniform relation to each other in their action on the crop. The particular arrangement of devices connecting the differentially-geared driving-shaft F with the rake-shaft is immaterial. It may, as above stated, be through a pulley or sprocket wheel located directly on the end of the differentially-geared shaft, in which case said shaft, moving at a higher speed than the axle, where the driving-pulley has ordinarily been located, a smaller pulley will be required relatively to the driving-pulley actuating the rake; but this may be obviated, as also the necessity of changing the direction of movement of the belt, owing to the changed direction of rotation of the pulley, by making the wheel E a spur-wheel, and gearing back to a larger spur-wheel rotating freely on the axle, and connected with a pulley for driving the reel or rake chain. Any of the usual or preferred arrangements for connecting the reel or rake with and driving it from its driving-shaft may, however, be employed, the sole object of the present invention, as above stated, being to combine the reel or rake with the differentially-geared shaft, through which the speed of vibration of the sickle is changed, whereby, whatever may be the speed of the cutters, the speed of the reel, or reel and rake, relatively thereto and to the work to be done, will be preserved.

Having now described how the invention may be carried out in practice, what we claim as new, and desire to secure by Letters Patent, is—

The combination of the wheel or pulley which drives the reel or rake with the differentially-geared shaft from which motion is communicated to the cutters, and through which the speed of the cutters is changed, as described, whereby any change in the speed of vibration of the cutters will be accompanied by a corresponding change in the speed of the reel or rake, for the purpose and substantially as specified.

In testimony whereof, we have hereunto set our hands this 3d day of January, A. D. 1873.

ALEX. GORDON.
   J. H. MYERS.
   GEORGE TELFORD.
   M. G. HUBBARD.

Witnesses:
 E. R. OTTOWAY,
 HARVEY D. GORDON.